United States Patent [19]
de Bazelaire

[11] Patent Number: 6,032,104
[45] Date of Patent: Feb. 29, 2000

[54] METHOD OF PROCESSING SEISMIC SIGNALS SO AS TO REDUCE THE EFFECTS OF DIP IN THE ANALYSIS OF MOVEOUTS

[75] Inventor: Eric de Bazelaire, Lescar, France

[73] Assignee: Elf Exploration Production, France

[21] Appl. No.: 09/024,292

[22] Filed: Feb. 17, 1998

[30]     Foreign Application Priority Data

Feb. 20, 1997 [FR] France ................................ 97 02019

[51] Int. Cl.$^7$ ...................................................... G01V 1/36
[52] U.S. Cl. ............................... 702/53; 367/63; 367/73; 364/421
[58] Field of Search ................................. 367/51, 53, 52, 367/48, 63, 73; 364/421

[56]             References Cited

U.S. PATENT DOCUMENTS

| 4,503,527 | 3/1985 | Pann ........................................... 367/53 |
| 5,285,422 | 2/1994 | Gonzalez et al. ........................... 367/53 |
| 5,596,547 | 1/1997 | Bancroft et al. ............................ 367/51 |

FOREIGN PATENT DOCUMENTS

| 2726091 | 10/1994 | France . |
| 96/12975 | 5/1996 | WIPO . |

OTHER PUBLICATIONS

*Geophysics*, "Normal moveout revisited: Inhomogeneous media and curved interfaces"; vol. 53, No. 2; (Feb. 1988) pp. 143–157; Eric de Bazelaire.

First Break, "What is DMO?", vol. 4, No. 7, Jul. 1986, pp. 7–24.

*Geophysics*, "A three–dimensional perspective on two–dimensional dip moveout"; vol. 53, No. 5 (May 1988), pp. 604–610; David Forel and Gerald H.F. Gardner.

*Primary Examiner*—Christine K. Oda
*Assistant Examiner*—Anthony Jolly
*Attorney, Agent, or Firm*—Ostrolenk, Faber, Gerb & Soffen, LLP

[57]             ABSTRACT

A method of processing seismic signals for the analysis of moveout is presented in which waves are transmitted in a medium, reflected, received by receivers and recorded in the form of seismic traces. A string of N integers is defined having indices j lying between two limits ($j_{min}$, $j_{max}$) and representative of the moveouts of at least one predetermined gather of traces. A focus depth time $t_p$ for each value of j is calculated. A string of P integer numbers u is defined which determines an interval $(P-1)\Delta X$. For each value of j, each trace identified by its parameters $X_0$ and h is copied as many times as there are integer numbers u in the interval $(P-1)\Delta X$. At least one static correction (dt) is applied to each of the copied traces, dependent at least on the parameters j, h and u $\Delta X$. Copying and static correction are repeated for all the values of $X_0$ and of j.

22 Claims, 2 Drawing Sheets

METHOD OF PROCESSING SEISMIC SIGNALS SO AS TO REDUCE THE EFFECTS OF DIP IN THE ANALYSIS OF MOVEOUTS

The present invention relates to a method of processing seismic signals so as to reduce the effects of dip in the analysis of moveouts. It relates more particularly to a method of correction of the type which is designated by specialists as being a DMO (DIP MOVEOUT) correction, the essential property of which is to render the moveouts independent of dip by referring them to those for zero dips.

Numerous so-called DMO correction methods have been proposed since 1978, the document written by Deregowski in 1986 and entitled "What is DMO?" (FIRST BREAK, vol. 04, July 1986, pages 07–24) constituting a summary of the DMO operators used theretofore.

Thus, multiple-coverage seismic processing requires the stacking of the traces recorded with the aid of a set of transmitters and receivers and grouped into a gather of common midpoint (CMP) traces. To perform this stacking, the slant of the traces must be corrected before they are stacked. Conventionally, a dynamic correction referred to as NMO (NORMAL MOVEOUT) is performed first, followed by another so-called DMO dynamic correction.

To satisfy oneself of this it is merely necessary to refer to the study carried out by Deregowski, and to observe that the value of the DMO time discrepancy $\Delta t$ is a difference in transit which depends on time, offset and dip angle. This is why the DMO correction is made after the NMO dynamic correction.

Moreover, it should be noted that the slant corrections are valid only for monotonic series of dips and that in the event of conflicts of dips, as for example in complex tectonics, the known DMO operators cannot be applied.

Other authors have attempted to extend DMO to cases of velocity fields whose value varies solely as a function of depth, this amounting to regarding the curves or surfaces of constant velocity as being straight lines or horizontal planes.

Other proposals have been made, especially by Forel and Gardner ("A three-dimensional perspective on two-dimensional moveout", GEOPHYSICS vol. 53, 1988, pages 604–610), which consist in performing DMO before NMO. Such a proposal is unsatisfactory since it takes into consideration approximate data relating to the offset h and to the time t in such a way as to compensate for the nonlinear difference which exists between the NMO (h) followed by DMO (h) route and the DMO (h) followed by NMO (h) route. To reach the same point via the two routes, Forel and Gardner define a pseudo-offset h' and a substitute time $t_1$ which replaces the time to of conventional DMO. This procedure makes it possible to carry out velocity analyses after applying DMO, the velocity analyses usually being performed roughly every 500 meters. A bilinear interpolation (in x and t) is then performed between these velocity analyses. It is easy to understand that the enormous spatial sampling step chosen (roughly 500 meters) means that the velocity is always spatially aliased and that the straightening of the distal traces is then imperfect between the measurement points.

Moreover, all of the above methods require a priori knowledge of the DMO-corrected stacking velocity field, something which is never the case and compels engineers to proceed via successive iterations.

Furthermore, in respect of moveout analysis, in 1988 Eric de Bazelaire introduced the concept of focus depth time ($t_p$) (NMO revisited: inhomogeneous media and curved interfaces: GEOPHYSICS, vol. 53, no. 2, pages 143–157) which has the advantage of being independent of the time $t_0$. The method of velocity analysis developed by the applicant, Eric de Bazelaire is used to construct improved stack sections, termed "POLYSTACK" sections, and it consists of compiling a document referred to as a "bap" which is associated with a common midpoint gather of recorded seismic traces.

The "bap" associated with a gather of common midpoint (CMP) traces is another gather of traces each of which is the result of stacking the traces of the CMP gather, after applying a correction of static type (independent of time) which differs from one trace to the next to each of these traces. A more detailed definition of the conventional POLYSTACK process and of the calculation of the $t_p$ is for example given in another patent application by the Applicant filed on Oct. 19, 1994, published as no. 2 726 091 and relating to another original method termed DELTASTACK.

The object of the present invention is the application of a novel DMO operator in which the DMO used is a static correction which involves in particular the focus depth time $t_p$ and especially a method in which the two specific NMO and DMO operators are static and switchable.

Another advantage of the present invention resides in the fact that it demands no a priori knowledge of the stacking velocity field.

Another advantage of the present invention is that it can be applied both in calm tectonics and in complex tectonics, something which it has not been possible to achieve hitherto.

The method according to the invention is characterized in that it consists in performing the following steps:

a—transmitting acoustic waves into a medium from at least one transmission source, b—receiving, on receivers, waves reflected in the said medium and recording the said waves in the form of seismic traces, each seismic trace being at least labelled by an offset (h) and a midpoint ($x_0$) which are tied to the source/receiver pair which generated the said seismic trace, two consecutive midpoints ($x_0$) for the same offset h being separated by a constant gap $\Delta x$, c—defining a string of N integer indices j lying between two limits ($j_{min}$, $j_{max}$) and representative of the moveouts of at least one predetermined gather of traces, d—calculating a focus depth time $t_p$ for each value of j, e—defining a string of P integer numbers u determining an interval (P−1)$\Delta x$, f—copying, for each value of j, each trace identified by its parameters $x_0$ and h, as many times as there are integer numbers u in the interval (P−1)$\Delta x$, g—applying at least one static correction (dt), DMO PSCAN, to each of the said copied traces, dependent at least on the parameters j, h and u $\Delta x$, h—repeating steps f and g for all the values of $x_0$ and of j.

According to a characteristic of the invention, the predetermined gather of traces consists of a collection of common midpoint (CMP) gathers, and in that it furthermore consists in:

ordering the common midpoint (CMP) gathers according to increasing values of $x_0$ and the traces of each common midpoint (CMP) gather according to increasing values of h, and in then applying another static correction ($\Delta t$), termed NMO PSCAN, to each of the traces of each common midpoint gather, before applying the said static correction (dt).

According to a characteristic of the invention, the predetermined gather of traces consists of a collection of gathers (H) with constant offset h, the traces of each constant-offset gather (H) being ordered according to increasing values of $x_0$, the gathers (H) being ordered according to increasing values of h, and in that it consists of performing steps f and g for all the traces, when they exist, of each gather (H).

According to another characteristic of the invention, for each value of j, a block comprising the common midpoint (CMP) gathers ordered according to increasing values of $x_0$ is constructed, and the constant-offset gathers (H) ordered according to increasing values of the offset h, the said NMO PSCAN static correction $\Delta t$ is applied for all the values of j and to all the traces of all the common midpoint gathers.

According to a characteristic of the invention, for each constant-offset gather (H):

- select an abscissa position $x_u$, in the interval $(P-1)\Delta x$, for which a seismic trace exists,
- positioning the trace $x_0$ at the point $x_u$,
- apply correction (dt) to the trace positioned at $x_u$,
- stack the corrected static trace (dt), sample by sample, with the existing trace at the point with ascissa $x_u$.

According to a characteristic of the invention, the operations performed on the traces $x_0$ and $x_u$ are repeated for all the values of u associated with the interval $(P-1)\Delta x$, and then for all the values $x_0$ of each gather (H) and for all the gathers (H) of each block j.

According to a characteristic of the invention, the method furthermore comprises constructing ITP planes each of which is characterized by an index j and is composed of traces located at various values of $x_0$ for which there exists a seismic trace, the said traces being the result of the two static corrections ($\Delta t$ and dt), so as to obtain an ITP plane corrected for migration to zero offset (MZO).

According to a characteristic of the invention, the MZO-corrected ITP planes are collected into a block with axes x, t and j so as to constitute an MZO-corrected ITP block.

According to a characteristic of the invention, the NMO PSCAN static correction ($\Delta t$) is performed before the so-called DMO PSCAN static correction (dt).

According to a characteristic of the invention, the DMO PSCAN static correction (dt) is performed before the NMO PSCAN correction ($\Delta t$).

According to a characteristic of the invention, the predetermined gather of traces is a shotpoint gather of elementary traces and in that it is comprised of performing the following steps:

a) identifying each elementary trace by the abscissa $x_0$ of the corresponding midpoint, the offset h, the value u in the interval $(P-1)\Delta x$ and an index j, b) constructing, for each value of j, a plane ITP(j) composed of zero traces located at each value of $x_0$ for which there exists a seismic trace, c) selecting an elementary trace with abscissa $x_0$ and copying it at a point with abscissa $x_0$ for which there exists a seismic trace in the plane ITP(j), d) applying an MZO static correction ($\Delta' t$) to the copied trace, the MZO static correction being the sum of two static corrections NMO PSCAN ($\Delta t$) and DMO PSCAN (dt), the NMO PSCAN static correction ($\Delta t$) depending only on the parameters j and h and the DMO PSCAN static correction (dt) depending on the parameters j, h, u and $\Delta x$, e) stacking the said copied and MZO-corrected trace with the existing trace at the point with abscissa $x_u$, f) recommencing the above steps for all the values of u, all the values of h and all the values of j, g) performing steps b) to f) for each of the traces of the said shotpoint gather.

According to a characteristic of the invention, the NMO PSCAN static correction ($\Delta t$) is given by the formula:

$$\Delta t(j, h) = -t_p(j) + \sqrt{(t_p(j))^2 + (h/V_0)^2}$$

in which $V_0$ is the velocity of entry into the medium.

According to a characteristic of the invention, the DMO PSCAN static correction (dt) is given by the formula:

$$dt(j, h, u) = -t_p(j) \left[ 1 - \sqrt{1 - \frac{(u\Delta x)^2}{h^2}} \right]$$

According to a characteristic of the invention, the MZO global static correction ($\Delta' t$) is given by the formula:

$$\Delta' t(j, h, u) = \sqrt{t_p^2(j) + \frac{h^2}{V_0^2}} - t_p(j)\sqrt{1 - \frac{(u\Delta x)^2}{h^2}}$$

in which $V_0$ is the velocity of entry into the medium.

Other advantages and characteristics will emerge clearly from a reading of several embodiments of the invention, as well as from the appended drawings in which.

According to a first variant of the method of the present invention, a collection of seismic traces is compiled, these being obtained with the aid of a device which includes one or more transmission sources, designated as being shotpoints, and receivers/recorders, the sources and the receivers being arranged on the surface of a medium which it is desired to explore.

Hence, this provides a collection of seismic traces which are sampled over time with a sampling step $\delta t$ and are grouped into several shotpoint gathers. Each shotpoint gather corresponds to the collection of traces recorded for a given transmission (shot). Each seismic trace is identified by several parameters such as the coordinates of the spatial positions of the shotpoint or transmission source $(x_s, y_s)$ pair and of the receiver $(x_r, y_r)$, which generated the seismic trace.

The identification also comprises the calculated values $(x_0, y_0)$ of the coordinates of the midpoint (MP) and of the offset (h) which are associated with the said pair, derived from the following well known formulae:

$$x_0 = \frac{x_s + x_r}{2} \qquad y_0 = \frac{y_s + y_r}{2} \tag{1}$$

$$\left(h = \sqrt{(x_r - x_s)}\right)^2 + (y_r - y_s)^2$$

In two-dimensional (2D) seismic surveying, it is assumed that $y_0$ remains constant along the entire seismic line and that two consecutive values of $x_0$ are separated by a constant value $\Delta x$ termed the inter CMP distance for common midpoint gathers.

In a first step, the value of the maximum offset $h_{max}$ is extracted from the above values. The mean passband B of the signals recorded on the seismic traces is measured with the aid of known methods. A string of N integer indices j is defined, from which are calculated the values of $t_p$ which will be used to compile the block of baps.

These values are obtained by applying the formula:

$$t_p(j) = \frac{1}{2}\left(\frac{h_{max}^2 B}{V_0^2 kj} - \frac{kj}{B}\right) \qquad (2)$$

The indices j (indices $t_p$) are positive integers for the positive values of $t_p$ and negative for negative values of $t_p$. The zero $t_p$ index corresponds to $t_p$ infinite. The number of $t_p$ indices is limited by the operator. The index $j_{max}$ corresponds to the largest moveout in the time-distance curves which are scanned and it is chosen in such a way as to cover all of the supposed moveouts in the medium to be explored. The index $j_{min}$ is at most equal to $-j_{max}$. The parameter k is a constant which defines the moveout sampling step; it conventionally has a value lying between 0.5 and 0.7. Finally $V_0$ is a constant representing the velocity in m/s of the medium within which the moveouts are measured in terms of focus depth time (the focus depth p is equal to 0.5 $V_0.t_p$).

Figure 1:
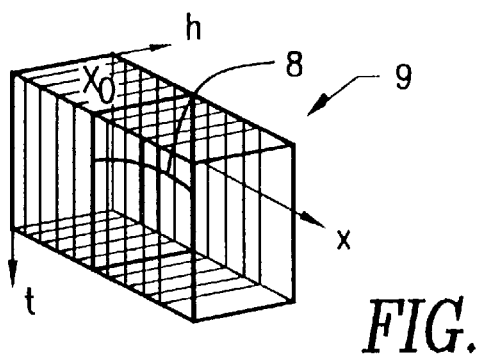
FIG. 1 is a diagrammatic representation of a block of planes, each plane representing a gather of common midpoint (CMP) traces.
Figure 2:
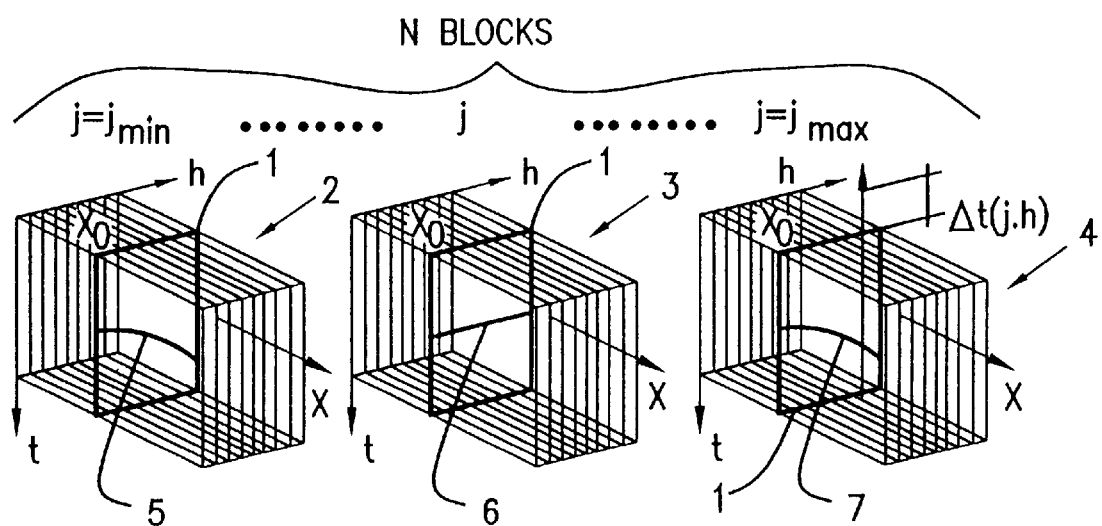
FIG. 2 is a representation of blocks for various values of j such as $j_{min}$, j and $j_{max}$, each block comprising planes representing gathers of CMP traces and planes H representing gathers of constant-offset or iso-offset sorted traces.

In a second step and according to a first embodiment, the gathers of shotpoint traces are grouped according to a first series of CMP gathers which are ordered according to increasing values of the midpoints $x_0$ along the x axis, each CMP gather lying in a plane with abscissa $x_0$, $x_1$ . . . , a single CMP plane 1 with abscissa $x_0$ being represented in FIG. 2. The traces of each CMP plane are ordered according to increasing values of h.

In a third step, a static correction (NMO PSCAN) is applied to the traces of the CMP gathers as follows:

a) each CMP gather is replicated N times, b) a static correction $\Delta t$, termed NMO PSCAN, and defined by the formula:

$$\Delta t(j, h) = -t_p(j) + \sqrt{t_p(j)^2 + (h/V_0)^2} \qquad (3)$$

is applied to the traces of a replicated CMP gather corresponding to a value of j, c) sub-step b) is repeated for all the values j and for all the CMP gathers.

For each value of j, this gives a block j of CMP gathers whose traces are NMO PSCAN-corrected.

Since in general the calculation of the static correction $\Delta t(j, h)$ does not yield the sampling step $\delta t$ an integer number of times, the samples are linearly interpolated.

In a fourth step, and for each block j, the constant-offset traces are sorted so as to obtain, for each value of h, an iso-offset gather lying in a plane H, parallel to the plane xot. The H planes are ordered according to increasing values of h and the traces of each H plane are ordered according to increasing values of $x_0$.

In FIG. 2 are represented three blocks 2, 3, 4 corresponding to the values $j_{min}$, j and $j_{max}$, each of the blocks comprising a number n of H planes, a few of which are represented and a number q of CMP planes, just one of which is represented. In the CMP plane of block 4 corresponding to $j_{max}$, the NMO PSCAN static correction has been represented for the value $j_{max}$ and for a value h. The result of the correction is shown diagrammatically by an over-corrected time-distance curve 7. In block 3 corresponding to index j, the result of the NMO PSCAN static correction is shown diagrammatically by a horizontal corrected time-distance curve 6 whereas in block 2 corresponding to $j_{min}$, the result of the NMO PSCAN static correction is shown diagrammatically by an under-corrected time-distance curve 5. A comparison of the corrected time-distance curves 5, 6, 7 with the initial time-distance curve 8 of the starting block 9 shows that the right correction is that represented in block 3 (horizontal time-distance curve).

Figure 3:
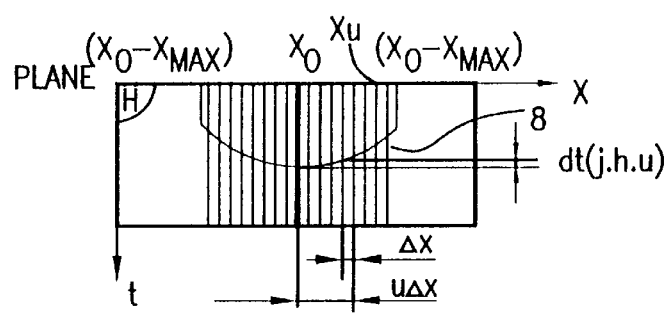
FIG. 3 is a diagrammatic representation of an H plane with a DMO PSCAN operator.

For each elementary H plane such as represented in FIG. 3, characterized by its offset h, a limit value $x_{max}$ is calculated with the aid of the formula:

$$x_{max} = \frac{h^2}{\sqrt{V_0^2 \, t_p(j)^2 + h^2}} \qquad (4)$$

Each elementary H plane contains all the traces positioned at the various values $x_0$ defining the midpoints MP which are ordered according to increasing values of $x_0$.

A string of P integer numbers u such that $u\Delta x$ lies between $(x_0-x_{max})$ and $(x_0+x_{max})$ is determined for each of the said values $x_0$ defining a CMP position of the said elementary H plane. The residual less than $\Delta x$ at the two ends is not taken into consideration. This gives the following formula:

$$x_0 - x_{max} \leq u\Delta x + x_0 \leq x_0 + x_{max} \qquad (5)$$

A static correction, termed DMO PSCAN, is applied to each of the traces of each H plane with the aid of the formula:

$$dt(j, h, u) = -t_p(j)\left[1 - \sqrt{1 - \frac{(u\Delta x)^2}{h^2}}\right] \qquad (6)$$

The DMO PSCAN correction operator is an elliptic envelope 8 (FIG. 3), the static correction being performed as follows:

i) the envelope 8 is centered on a value $x_0$ and the $x_0$-trace is copied onto the envelope 8 for each increment $u\Delta x$, ii) each trace copied onto the envelope 8 is stacked, sample by sample, with the existing trace at the same abscissa. For example, the copied trace located at the abscissa $x_u$ ($x_0+u\Delta x$) is stacked with the trace of the existing H plane at the said abscissa $x_u$.

iii) This operation is repeated for each value $x_0$ of the H plane, this involving shifting the envelope 8 and centering it on the new vlaue of $x_0$.

In a next step and for each value of j, a plane ITP(j) is constructed characterized by its index j and composed of zero traces located at the various values of $x_0$ for which a seismic trace exists.

The result of the stacking for all the values of $x_0$ of steps ii and iii, which corresponds to as many stacked traces as there are values $x_0$ in the H plane, is transferred into the plane ITP(j) at the points with corresponding abscissae.

Since, in general, the calculation of the static correction dt(j, h, u) does not yield the sampling step $\delta t$ an integer number of times, the samples are interpolated linearly before being stacked.

In this way, DMO PSCAN-corrected stacked traces are obtained.

Figure 4:
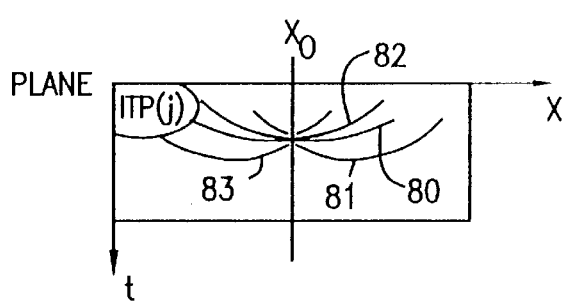
FIG. 4 is a diagrammatic representation of an ITP plane for a given j.

Several positions of the envelope 8 for the same H plane, for example that of FIG. 3, have been represented in the plane ITP(j) of FIG. 4, each of the positions being centered on a different value of $x_0$, but nevertheless passing through the same point with coordinates $x_0$, $t_0$.

The above operations are repeated for all the H planes of block j.

The result of this series of operations is that an ITP plane is obtained which is characterized by its index j and is corrected for migration to zero offset MZO since each trace has undergone two static corrections, one with the aid of the NMO PSCAN operator Δt(j, h) and the other with the aid of the DMO PSCAN operator dt(j, h, u). Since the two corrections defined by the formulae (3) and (6) are independent of time, we do indeed have two static corrections.

Figure 5:
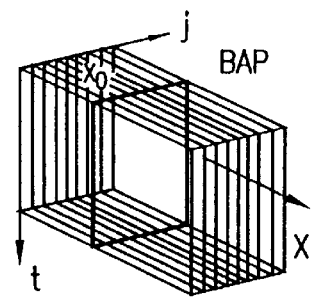
FIG. 5 is a diagrammatic representation of a block of bap and ITP planes.

In succeeding steps, ITP planes corrected for MZO are constructed for all the values of j. The collection of ITP planes each corrected for MZO then constitutes an MZO-corrected bap block, whose axes are x, t and j (FIG. 5). A section of this block through a plane at constant $x_0$ constitutes an elementary bap which can be introduced into a procedure of the POLYSTACK type instead of conventional baps.

In a second embodiment, the traces recorded at constant offset h are sorted so as to obtain n gathers of iso-offset traces, each gather lying in an H plane parallel to the plane xot. The previously described operations for DMO PSCAN static correction dt of formula (6) are performed on the traces of the H planes of each block j.

The traces of each block j, corrected for DMO PSACAN, are reorganized into CMP gathers in each of which the CMP traces are ordered according to increasing values of h. In each CMP gather an NMO PSCAN correction (Δt) such as described earlier is applied to each of the traces; the traces corrected for NMO PSCAN are stacked to obtain, at the point with abscissa $x_0$, an MZO-corrected stacked trace. The stacked trace is positioned in the ITP plane with the same index j as that of the processed gather so that an MZO-corrected plane ITP (j) is obtained.

These operations are repeated for all the values of j so as to obtain the block of FIG. 5.

According to a more simplified and hence more easily implemented third embodiment, which requires less computing time and fewer separate operations, the method according to the invention consists in an initial step, with the aid of the above formulae, in calculating the coordinates ($x_0$, $y_0$) of the common midpoint, of the offset h (formula 1), the value of the maximum offset $h_{max}$, the values of $t_p(j)$ (formula 2), the limit values $x_{max}$ (formula 4), the interval $(P-1)\Delta x$ and the string of P integer numbers u.

In another step according to this third embodiment, a plane denoted ITP(j) composed of zero traces located at each value of $x_0$ for which a seismic trace is available is created directly for each value of j. These N planes are sorted according to increasing values of j so as to obtain a bap block whose axes are x, t and j.

In a next step, an elementary trace arising from the shotpoint gathers is picked. This trace is characterized by its parameters $x_0$ and h.

For each value of j, for each value of h and for each value of u, these values being defined above, the following operation is repeated:

the elementary trace is copied, it is placed at the point with abscissa $x_u$ in the plane ITP(j), it is made to undergo a static correction of value Δ't defined by the equation below and it is stacked sample by sample with the trace already present in the plane ITP(j) and with abscissa $x_u$. The equation for this so-called MZO PSCAN static correction is the following:

$$\Delta' t(j, h, u) = \sqrt{t_p^2(j) + \frac{h^2}{V_0^2}} - t_p(j)\sqrt{1 - \frac{(u\Delta x)^2}{h^2}} \quad (7)$$

Since in general the calculation of the static correction Δ't($x_0$, j, h, u) does not yield the sampling step δt an integer number of times, the samples are interpolated linearly before being stacked.

The operation is repeated for all the P values of u, for all the n values of h and for all the N values of j. Having accomplished this, the next trace is dealt with. Processing is therefore single-channel.

When all the incident traces have been analyzed, an MZO-corrected bap block is obtained, its axes being x, t and j (FIG. 5). A section of this block through a plane with constant $x_0$ constitutes an elementary bap which can be introduced into a POLYSTACK type procedure instead of the conventional baps.

From the foregoing it is noteworthy to observe that a DMO PSCAN static correction can be performed before or after the so-called NMO PSCAN static correction or else the two static corrections can be combined in order to make just one static correction directly on the starting or original traces of the shotpoint gather.

Once the block of baps corrected for DMO PSCAN is obtained, the automatic moveout analysis can be performed which will subsequently make it possible to define the velocity field corrected for DMO PSCAN.

What is claimed is:

1. Method of processing seismic signals for moveout analysis, comprising the steps of:

a—transmitting acoustic waves into a medium from at least one transmission source, b—receiving, on receivers, waves reflected in the medium and recording the waves in the form of seismic traces, each seismic trace being at least labelled by an offset (h) and a midpoint ($X_0$) which are tied to the source/receiver pair which generated the seismic trace, two consecutive midpoints ($X_0$) for the same offset h being separated by a constant gap Δx, c—defining a string of N integer indices j lying between two limits ($j_{min}$, $j_{max}$) and representative of the moveouts of at least one predetermined gather of traces, d—calculating a focus depth time $t_p$ for each value of j, e—defining a string of P integer numbers u determining an interval $(P-1)\Delta x$, f—copying, for each value of j, each trace identified by its parameters $X_0$ and h, as many times as there are integer numbers u in the interval $(P-1)\Delta x$, g—applying at least one static correction (dt), DMO PSCAN, to each of the copied traces, dependent at least on the parameters j, h and u Δx, h—repeating steps f and g for all values of $X_0$ and of j.

2. A method according to claim 1, wherein the predetermined gather of traces is a collection of common midpoint (CMP) gathers, and further comprising the additional steps of:

ordering the common midpoint (CMP) gathers according to increasing values of $X_0$ and the traces of each common midpoint (CMP) gather according to increasing values of h, and applying another static correction (Δt), termed NMO PSCAN, to each of the traces of each common midpoint gather, before applying the static correction (dt).

3. A method according to claim 1, wherein the predetermined gather of traces is a collection of gathers (H) with constant offset h, the traces of each constant-offset gather (H) being ordered according to increasing values of $X_0$, the gathers (H) being ordered according to increasing values of h, and wherein steps f and g are carried out for all the traces, when they exist, of each gather (H).

4. A method of processing seismic signals for moveout analysis, comprising the steps of:

a—transmitting acoustic waves into a medium from at least one transmission source, b—receiving, on receivers, waves reflected in the said medium and recording the said waves in the form of seismic traces, each seismic trace being at least labelled by an offset (h) and a midpoint ($X_0$) which are tied to the source/receiver pair which generated the said seismic trace, two consecutive midpoints ($X_0$) for the same offset h being separated by a constant gap $\Delta x$, c—defining a string of N integer indices j lying between two limits ($j_{min}$, $j_{max}$) and representative of the moveouts of at least one predetermined gather of said traces, said gather of said traces being a shotpoint gather of elementary traces, d—calculating a focus depth time $t_p$ for each value of j, e—defining a string of P integer numbers u determining an interval $(P-1)\Delta x$, f—identifying each elementary trace by the abscissa $X_0$ of the corresponding midpoint, the offset h, the value u in the interval $(P-1)\Delta x$ and an index j, g—constructing, for each value of j, a plane ITP(j) composed of zero traces located at each value of $X_0$ for which there exists a seismic trace, h—selecting an elementary trace with abscissa $X_0$ and copying it at a point with abscissa $X_0$ for which there exists a seismic trace in the plane ITP(j), i—applying an MZO static correction ($\Delta't$) to the copied trace, the MZO static correction being the sum of two static corrections NMO PSCAN ($\Delta t$) and DMO PSCAN (dt), the NMO PSCAN static correction ($\Delta t$) depending only on the parameters j and h and the DMO PSCAN static correction (dt) depending on the parameters j, h, u and $\Delta x$, k—stacking the copied and MZO-corrected trace with the existing trace at the point with abscissa $X_u$, l—repeating the above steps for all the values of u, all the values of h and all the values of j, m—performing steps g to l for each of the traces of the said shotpoint gather.

5. A method according to claim 4, wherein the NMO PSCAN static correction ($\Delta t$) is given by the formula:

$$\Delta t(j, h) = -t_p(j) + \sqrt{(t_p(j))^2 + (h/V_0)^2}$$

in which $V_0$ is the velocity of entry into the medium.

6. A method according to claim 4, wherein the DMO PSCAN static correction (dt) is given by the formula:

$$dt(j, h, u) = -t_p(j)\left[1 - \sqrt{1 - \frac{(u\Delta x)^2}{h^2}}\right].$$

7. A method according to claim 4, wherein the MZO global static correction ($\Delta't$) is given by the formula:

$$\Delta't(j, h, u) = \sqrt{t_p^2(j) + \frac{h^2}{V_0^2}} - t_p(j)\sqrt{1 - \frac{(u\Delta x)^2}{h^2}}$$

in which $V_0$ is the velocity of entry into the medium.

8. A method according to claim 1, wherein the DMO PSCAN static correction (dt) is given by the formula:

$$dt(j, h, u) = -t_p(j)\left[1 - \sqrt{1 - \frac{(u\Delta x)^2}{h^2}}\right].$$

9. A method according to claim 2, wherein the NMO PSCAN static correction ($\Delta t$) is performed before the so-called DMO PSCAN static correction (dt).

10. A method according to claim 2, wherein the so-called DMO PSCAN static correction (dt) is performed before the NMO PSCAN static correction ($\Delta t$).

11. A method according to claim 2, which further comprises the step of constructing for each value of j an ITP plane composed of traces located at various values of $X_0$ for which there exists a seismic trace, the said traces being the result of the two static corrections ($\Delta t$ and dt), so as to obtain an ITP plane corrected for migration to zero offset (MZO).

12. A method according to claim 11, wherein the MZO-corrected ITP planes are collected into a block with axes x, t and j so as to constitute an MZO-corrected ITP block.

13. A method according to claim 2, wherein the NMO PSCAN static correction ($\Delta t$) is given by the formula:

$$\Delta t(j, h) = -t_p(j) + \sqrt{(t_p(j))^2 + (h/V_0)^2}$$

in which $V_0$ is the velocity of entry into the medium.

14. A method of processing seismic signals for moveout analysis, comprising the steps of:

a—transmitting acoustic waves into a medium from at least one transmission source, b—receiving, on receivers, waves reflected in the said medium and recording the said waves in the form of seismic traces, each seismic trace being at least labelled by an offset (h) and a midpoint ($X_0$) which are tied to the source/receiver pair which generated the said seismic trace, two consecutive midpoints ($X_0$) for the same offset (h) being separated by a constant gap $\Delta x$, c—defining a string of N integer indices j lying between two limits ($j_{min}$, $j_{max}$) and representative of the moveouts of at least one predetermined gather of traces, d—producing for each value of j a block including all the received seismic traces ($X_0$, h) of the predetermined gather of traces, said seismic traces being ordered such that a collection of common midpoint (CMP) gathers is formed in a first direction of said block and a collection of gathers (H) with constant offset (h) is formed in a second direction of the block, said first and second directions being perpendicular to each other, said CMP gathers being ordered according to increasing values of ($X_0$), with the traces of each CMP gather ordered according to increasing values of (h), while said gathers (H) are ordered according to increasing values of (h) with the traces of each gather (H) ordered according to increasing values of ($X_0$), e—calculating a focus depth time $t_p$ for each value of j, f—defining a string of P integer numbers u determining an interval $(P-1)\Delta x$, g—copying, in each block, each trace identified by its parameters $X_0$ and h, as many times as there are integer numbers u in the interval (P−1)Δx, h—applying at least one static correction (dt), DMO PSCAN, to each of the copied traces, dependent at least on the parameters, j, h and u Δx, i—applying another static correction (Δt), NMO PSCAN, to each of the traces of each common midpoint gather (CMP), k—repeating steps g, h and i for all blocks corresponding to the N values of indices j.

15. A method according to claim 14, wherein in each constant-offset gather (H)

an abscissa position $X_u$ is selected in the interval (P−1)Δx, for which a seismic trace exists, the trace $X_0$ is positioned at the point $X_u$, the correction (dt) is applied to the trace positioned at $X_u$, and the corrected trace is stacked, sample by sample, with the existing trace at the point with abscissa $X_u$.

16. A method according to claim 15, wherein the operations performed on the traces $X_0$ and $X_u$ are repeated for all the integer values of u associated with the interval (P−1)Δx, and then for all the values $X_0$ of each gather (H) and for all the gathers (H) of each block j.

17. A method according to claim 14, which further comprises the step of constructing for each value of j an ITP plane composed of traces located at various values of $X_0$ for which there exists a seismic trace, the traces being the result of the two static corrections (Δt and dt), so as to obtain an ITP plane corrected for migration to zero offset (MZO).

18. A method according to claim 17, wherein the MZO-corrected ITP planes are collected into a block with axes x, t and j so as to constitute an MZO-corrected ITP block.

19. A method according to claim 18, wherein the NMO PSCAN static correction (Δt) is given by the formula:

$$\Delta t(j, h) = -t_P(j) + \sqrt{(t_P(j))^2 + (h/V_0)^2}$$

in which $V_0$ is the velocity of entry into the medium.

20. A method according to claim 18, wherein the DMO PSCAN static correction (dt) is given by the formula:

$$dt(j, h, u) = -t_P(j)\left[1 - \sqrt{1 - \frac{(u\Delta x)^2}{h^2}}\right].$$

21. A method according to claim 14, wherein the NMO PSCAN static correction (Δt) is performed before the so-called DMO PSCAN static correction (dt).

22. A method according to claim 14, wherein the so-called DMO PSCAN static correction (dt) is performed before the NMO PSCAN correction (Δt).

* * * * *